United States Patent [19]

Baghdady

[11] 3,909,725

[45] Sept. 30, 1975

[54] FREQUENCY MODULATION RECEIVER

[75] Inventor: Elie Joseph Baghdady, Cambridge, Mass.

[73] Assignee: Massachusetts Institute of Technology, Cambridge, Mass.

[22] Filed: Mar. 29, 1957

[21] Appl. No.: 649,345

[52] U.S. Cl. ................ 325/347; 325/344; 325/350; 329/134

[51] Int. Cl. ................ H04b 1/10

[58] Field of Search ......... 250/20.281, 27 PS, 27 N, 250/20.26, 20.52, 20.28; 179/171, 9 G; 329/123, 134; 325/344, 347

[56] References Cited

UNITED STATES PATENTS

| | | | |
|---|---|---|---|
| 2,272,401 | 2/1942 | Chaffee | 325/347 |
| 2,273,090 | 2/1942 | Crosby | 250/20.281 |
| 2,296,056 | 9/1942 | Roberts | 250/20.28 SO |
| 2,305,905 | 12/1942 | Shepard | 179/171 |
| 2,336,926 | 12/1943 | Crosby | 250/20.281 |
| 2,401,214 | 5/1946 | Worcester | 250/27 PS |
| 2,465,782 | 3/1949 | Bartelink | 250/27.1 |
| 2,616,967 | 11/1952 | Beukema | 250/27 PS |
| 2,617,019 | 11/1952 | Hepp | 250/27 PS |
| 2,672,529 | 3/1952 | Villard | 171/171 |
| 2,674,690 | 4/1954 | Arguimbau et al. | 325/344 |

OTHER PUBLICATIONS

"Synchronized Oscillators as F. M. Receiver Limiters," Electronics, August 1944, pp. 108 et seq.

*Primary Examiner*—Maynard R. Wilbur
*Assistant Examiner*—H. A. Birmiel
*Attorney, Agent, or Firm*—Kenway & Jenney

EXEMPLARY CLAIM

1. A frequency-modulation receiver comprising a driving amplifier having a pass band at least as great as twice the maximum frequency deviation of the signals to be received, a limiter connected to the output of the driving amplifier, detecting means connected to the limiter output, and an amplifier connected between the output and the input of the limiter to provide the condition of in-phase feedback only for signals lying near the center frequency of the pass band of the driving amplifier, said limiter and amplifier forming a feedback loop which provides regenerative feedback for a frequency-modulated signal input to the limiter.

4 Claims, 8 Drawing Figures

INVENTOR.
ELIE J. BAGHDADY
BY [signature]
ATTORNEYS

INVENTOR.
ELIE J. BAGHDADY
BY
ATTORNEYS

INVENTOR.
ELIE J. BAGHDADY
BY Kenway Jenney Witter & Hildreth
ATTORNEYS

FREQUENCY MODULATION RECEIVER

This invention relates to frequency-modulation receivers and is concerned with the problem of decreasing or eliminating the disturbances that can arise from the presence of interfering signals within the pass band of the receiver and with the possibility of suppressing or quieting interstation noise or noise coming through in the absence of input signals (automatic squelching).

This invention makes use of regenerative feedback around the limiter for the suppression of interference in FM reception. The feedback is applied from the output of one or more stages of amplitude-limiting to the input of the first or an intermediate stage of limiting in such a way that the fedback signals reach the input in phase (or nearly in phase) with the input signals. As will hereinafter appear, the feedback is regenerative, that is, in a direction and preferably of an amount to cause self oscillation to exist around the loop at the frequency of direct in-phase feedback in the absence of input signals. The feedback system can be made up of separate cascaded stages of limiting, each having its own feedback arrangement or of chains of limiting stages with the feedback path bridging one or more stages or with combinations thereof.

As will be shown in detail later, this system results in suppression of disturbance arising either from other signals or from impulsive interference. Also the system provides automatic squelching of background noise in the absence of a carrier at the input.

My theory shows that if the interference spectrum (caused by amplitude limiting the resultant of the desired and undesired signals) occupies a much wider band than is covered by the pass band of the filter which defines the feedback bandwidth. the interference suppression caused by the application of the feedback will be very pronounced. The maximum permissible band limitation is defined by one i-f bandwidth. A bandwidth at least equal to one i-f is preferred to ensure endistorted reproduction of the desired message. This means that when the desired and undesired signals differ in frequency by an amount which is varied from zero to a maximum of one i-f bandwidth the effect of regenerative feedback upon the interference ratio will result in increased improvement. When the frequency difference between the two signals is of the order of one-fourth the i-f bandwidth or more, the degree of improvement is pronounced.

In the accompanying drawings

Figure 1:
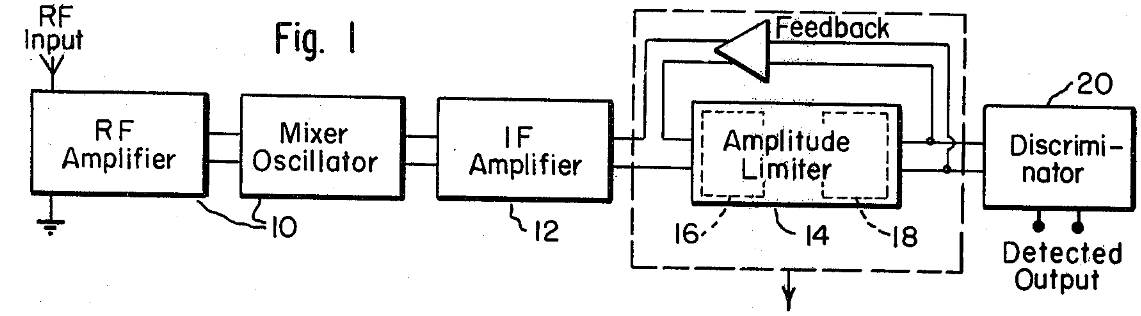
FIG. 1 is a block diagram of a receiver according to the present invention.

The illustrated embodiment of the invention comprises a receiver having a suitable radio-frequency amplifier and mixer-oscillator circuits 10, and an intermediate frequency amplifier 12, all of which may be of conventional form. Following the i-f amplifier is a limiter 14, preferably constructed in two stages 16 and 18. The limiter output is fed to a discriminator 20, which also may be of conventional form.

A feedback circuit 22 is connected to the output of the second limiter stage 18. The feedback circuit comprises an amplifier 24 and filter 26 and is loosely coupled to the last transformer of the i-f amplifier 12.

Each limiter stage has in its plate circuit a filter 28 which preferably has a bandwidth at least equal to the i-f bandwidth. The feedback circuit filter 26 in conjunction with the filters in the limiter, defines the extent of the feedback bandwidth to equal at least one i-f bandwidth.

The amount of feedback which is applied is controlled by a variable bias 32 in the grid circuit of the feedback amplifier 22. By varying the gain of the amplifier the variable grid bias offers a convenient control over the amount of feedback applied. The gain around the loop is preferably sufficient to cause a self-sustained oscillation to be generated in the absence of an inco ming signal. Under such conditions, there will result pronounced suppression of the weaker of two potentially interfering signals and pronounced squelch of interstation noise.

Whenever the receiver is receiving a desired signal of frequency p and there is a disturbance (interfering signal or noise) having an instantaneous frequency $p + r$, the resultant signal at the input of the limiter is $$e_i(t) = A(t) \cos [pt + \theta(t)], \tag{1}$$

where $A(t)$ represents such amplitude variations as exist, and $\theta$ is the instantaneous phase disturbance caused by presence of the interfering signal.

Without feedback the output of the limiter would be $$e_o(t) = k \cos [\mathrm{pt} + \theta(t)] \tag{2}$$

where $k$ is a constant voltage which represents the effect of the limiter when the voltage at the input exceeds the limiting threshold and $p$ is the frequency of the desired stronger signal in radians per second.

It can be shown that when the ratio of the weaker signal to the stronger is $a$ (called the interference ratio) the instantaneous deviation of the frequency of the resultant signal from the stronger signal is $$\frac{d\Theta}{dt} = ar \; \frac{\cos rt + a}{1 + 2a \cos rt + a^2}. \tag{3}$$

Figure 5:
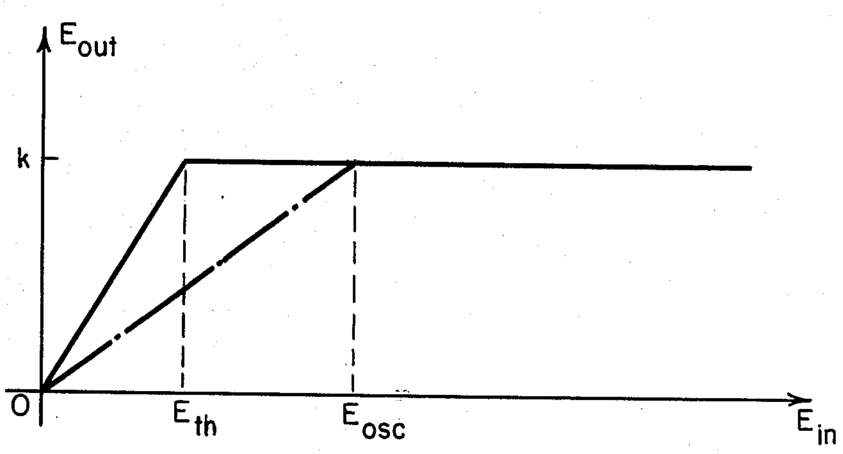

An ideal limiter is such that in response to any input voltage above a small threshold voltage there is perfect saturation with an output voltage amplitude of $k$ volts. The characteristic of an ideal limiter is shown in FIG. 5. It will be seen later that no substantial difference results from the use of any suitable limiter, even though not strictly ideal. For convenience, it will be assumed that in going through the limiter, with its associated ideal filter, no changes in phase are sustained by a signal wave. The net phase change around the loop will be assumed lumped into the phase angle $\phi_{fb}$ associated with the system function of the feedback amplifier, although in practice $\phi_{fb}$ would not be so concentrated. The feedback amplifier will be assumed to behave like an ideal bandpass filter.

A Fourier analysis of $e_o(t)$ leads to $$e_o(t) = k \sum_{n-\infty}^{\infty} A_n(a) \cos (p-nr)t \tag{4}$$

For the purposes of this discussion, Eq. 4 may be considered to define the Fourier amplitude functions $A_n(a)$, which pertain to the spectrum of the amplitude limited resultant of the two input carriers. This spectrum will henceforth be referred to as the "primary spectrum." Of the total spectrum produced by clipping the amplitude of the resultant of two sinusoids, the primary spectrum is only the portion which is centered about the frequency of the stronger sinusoid. This assumes that the two sinusoids differ in frequency by an amount which is negligible compared with the frequency of either.

Since we shall be mainly concerned with the effect of feedback around the limiter upon the capture performance in the presence of two-signal interference, we shall classify the feedback first on the basis of feedback bandwidth as compared with the extent of the significant portion of the primary spectrum, and second according to feedback angle at the center frequency of operation. On the basis of feedback bandwidth, we recognize two types of feedback: wideband feedback, and bandlimited (or narrow-band) feedback. When all of the spectral components of significant amplitude in the structure of the primary spectrum are fed back from the output of the limiter to its input, the operation will be termed wideband feedback. Bandlimited (or narrow-band) feedback will result if the limiter, or its associated feedback amplifier, has incorporated in it a filter which will prevent significant portions of the primary spectrum from reaching the input of the limiter. The feedback bandwidth is, therefore, defined either by the bandwidth of the limiter from whose output the feedback voltage is taken, or by the bandwidth of the amplifier in the feedback path, or by both.

Figure 3:
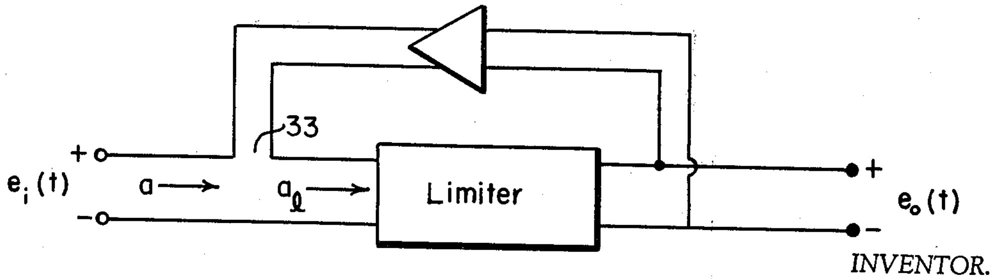
FIG. 3 is a block diagram to illustrate the principles of the invention.
Figure 4:
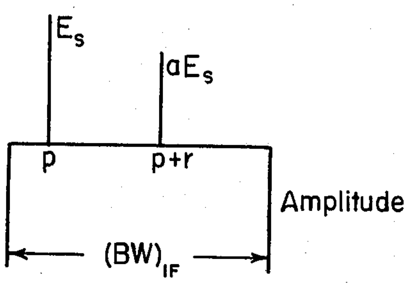
FIG. 4, 5 and 6 are explanatory diagrams.

Referring to FIG. 3, it is to be noted that a signal $e_o(t)$, as given by Eq. 3 appears at the output of the limiter, when the input to the limiter is given by $e_i(t)$ of Eq. 1. Assuming the time delay around the loop to be negligible, an initial feedback voltage $$e_{fb}(t) = KG \cos [pt + \theta(t)] \tag{5}$$

will appear across the terminals 33, where $G$ is the gain of the feedback amplifier. The initial feedback voltage adds to the voltage $e_i(t)$ in phase, and the resultant input to the limiter becomes $$e_R(t) = E_s[(1 + 2a \cos rt + a^2)^{1/2} + K_s] \cos (pt + \theta) \tag{6}$$

where, by definition, the feedback factor $K_s$ is given by:

$$K_s = kG/E_s,$$

and $E_s$ is the amplitude of the stronger signal at the output of the i-f amplifier. The initial feedback addition is, therefore, seen to affect only the instantaneous amplitude of the resultant signal at the input to the limiter, but otherwise it leaves the instantaneous phase variations unaltered.

Neglecting the effect of time delay around the loop enables us then to assume that the instantaneous phase angle of the feedback voltage will not differ noticeably from the instantaneous phase angle of the resultant input signal at any time. The effect of the positive (in-phase) feedback will, therefore, amount simply to an increase in the instantaneous amplitude of the input signal, and this in itself will leave the output of the limiter, as given by Eq. 3, unchanged. Since this limiter will deliver a voltage $e_o(t)$, as given by Eq. 3, regardless of what the amplitude of the input signal is (if the instantaneous phase angle at the input and output remain essentially the same), it is readily seen that a positive feedback steady-state will immediately be reached with the feedback voltage as given by Eq. 5, and therefore, with the net input to the limiter as given by Eq. 6.

Thus, positive feedback of the primary spectrum from the output of the limiter to its input, without significant band limitation of the feedback spectrum, will not affect the instantaneous frequency variations of the resultant signal at the input to the limiter. The principal effect of wideband feedback is therefore to saturate the limiter at reduced signal levels, as if the signal had been amplified before limiting. This is an important advantage, but the maximum advantages of the invention arise from narrow band positive feedback which will now be described.

Let us now consider the effect of band limitation in the feedback path. The feedback bandwidth will be assumed to be equal to the minimum practicable value of one i-f bandwidth. It will be readily realized that the most severe band limitation will arise when the two signals differ in frequency by one i-f bandwidth. The spectrum fed back will then consist of the components whose frequencies are $p$ and $p + r$ rad/sec only.

Thus, let us consider that the signal amplitudes at the input are given by $E_s$ at $p$, and $aE_s$ at $p + r$ rad/sec, where $a$ is less than unity, and $E_s$ is an arbitrary quantity that defines the signal level at the input; that the ideal limiter characteristic is such that for any $E_{in}>0$, $E_{out}$ equals a constant of $k$ volts peak; that the ideal limiter filter has a bandwidth equal to $(BW)_{if}$; and that the net effect of the feedback branch on the voltage is described by $Ge^{j\phi_{fb}(\omega)}$, where $\omega$ denotes angular frequency. G is the gain and $\phi_{fb}(\omega)$ the phase shift introduced by the feedback channel. For simplicity we shall start by neglecting the dependence of $\phi_{fb}$ upon $\omega$, and assume that the spectral components fed back arrive in phase with the corresponding signals at the input.

Thus, with the i-f delivering $e_i(t) = E_s \cos pt + aE_s \cos (p + r)t$ at the input where $r = (BW)_{if}$, and with the feedback applied, after a feedback steady-state has been reached, it can be shown that the new interference ratio (resultant ratio of weaker to stronger signal) is given by:

$$a_l = \frac{a + K_s A_{-1}(a_l)}{1 + K_s A_o(a_l)} \tag{9}$$

$A_o$ and $A_{-1}$ are components of the Fourier expansion of Eq. 4, and $a_l$ is the ratio of the weaker to the stronger signal as affected by the feedback. When $K_s$ is positive, $a_l$ is always less than $a$, which means that the resultant ratio of weaker-to-stronger signal at the input to the limiter is less than the original ratio delivered by the i-f. This indicates an improvement in the conditions for the capture of the stronger signal through an increase in the amplitude difference between the two signals. This is readily understood if it is remembered that the feedback adds to the originally stronger signal at $p$ a component of the same phase and frequency which is larger than the corresponding component added to the weaker signal at $p + r$. In so doing both signals increase in amplitude, but the originally stronger signal is favored with a larger boost than is the weaker signal. As far as the resultant signal across the input terminals of the limiter in FIG. 3 is concerned, the original two signals having relative amplitudes of 1 and $a$ are replaced by two signals of the same corresponding frequencies, having relative amplitudes 1 and $a_l$, where $a_l < a$.

Figure 7:
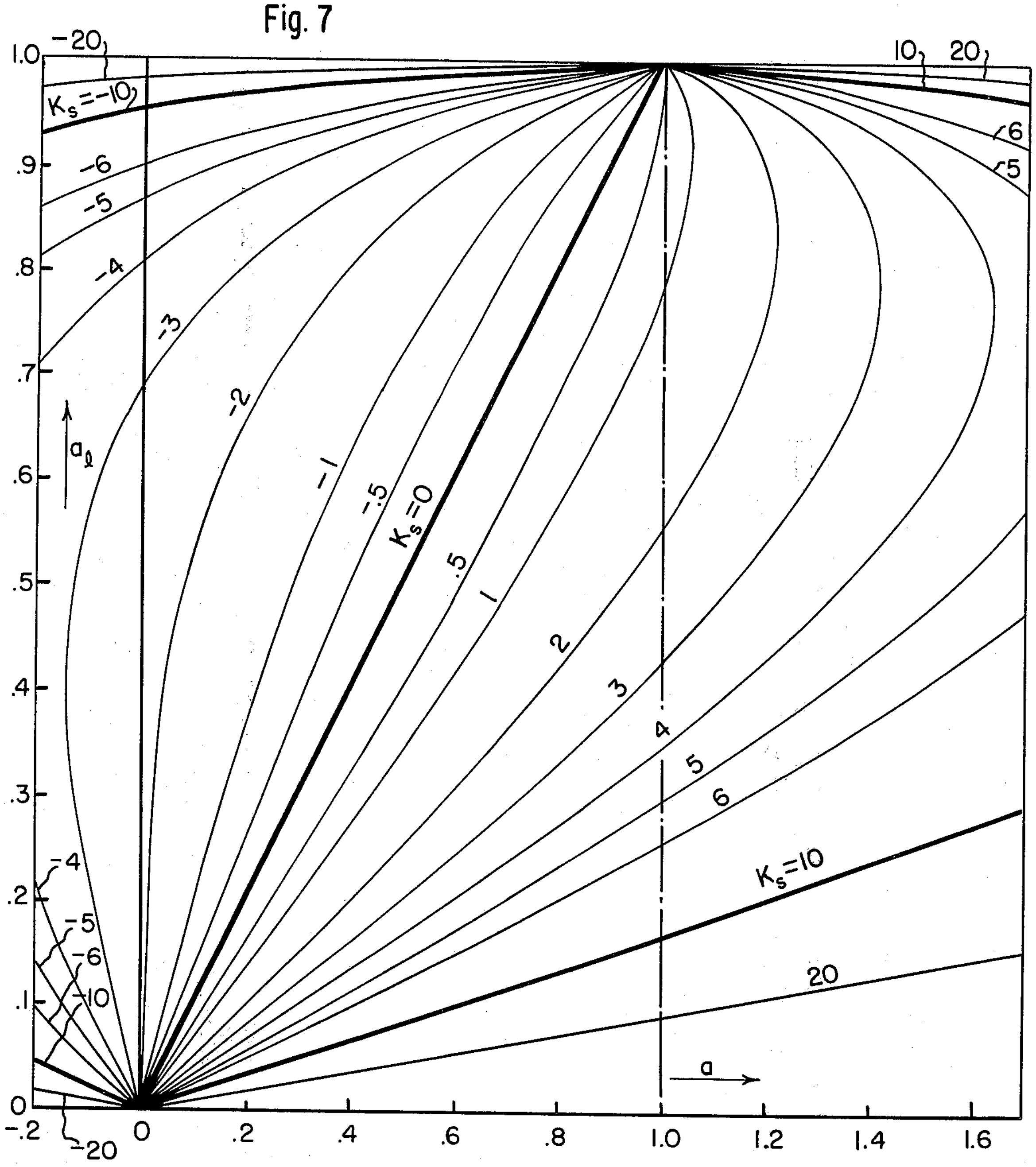
FIG. 7 is a plot illustrating the operation of the receiver.

The results are shown graphically by FIG. 7, in which $a_l$ is plotted against $a$ for different values of $K_s$. When $K_s = 0$ (no feedback), $a = a_l$ and the graph is simply the heavy line. For values of regenerative feedback ($K_s > 0$), the curves all lie to the right of the zero curve. In this region $a_l$ is always less than $a$. Curves may be also plotted of $a_l$ vs. $a$ for negative values of $K_s$ and some of these are shown in FIG. 7. They all lie to the left of the zero curve and show that for negative feedback, $a_l > a$, indicating that negative feedback increases the ratio of the weaker to the stronger signal and therefore increases the interference.

By increasing the amplitude of the overall resultant signal at the input to the limiter with positive feedback, a limiter that deviates from the ideal by having a finite non-zero limiting threshold operates more safely beyond this threshold of full saturation with a lower value of signal amplitude from the i-f amplifier.

Therefore if the feedback is taken from the output of one stage of limiting to its input through a feedback bandwidth equal to one i-f bandwidth, then, under the most adverse interference condition passed by the i-f amplifier, positive feedback will improve the capture conditions at the input to the limiter by: (a) increasing the difference in relative amplitude between the stronger and the weaker signals; and (b) decreasing the limiting threshold of a practical limiter through an increase in the effective signal amplitude seen by this limiter. Thus, while an ideal limiter is assumed for purposes of analysis, a practical limiter, even though not "ideal", does not substantially affect the improvement gained by the present invention.

A curious phenomenon is revealed by the positive feedback curves, which marks an important feature of the invention. The curves for the higher values of $K_s$ rise slowly as $a$ moves to the right, and project noticeably beyond the line $a = 1$, to relate values of $a > 1$ to values of $a_l < 1$. This means that once a feedback steady state has been established, the receiver will sometimes persist in capturing what starts to be the stronger signal during periods in which the originally weaker signal becomes larger than the captured one. This may be termed a "locking" or "flywheel" effect, and can occur when the originally weaker signal becomes the stronger one for a short interval of time compared to the period of message modulation.

For example, suppose that there is a temporary disturbance which grows until it becomes of greater amplitude than the wanted signal and then dies out, and assume that its duration is 10 microseconds. Such a disturbance can arise as a result of an impulse at the receiver input, since the characteristics of the i-f amplifier usually are such as to cause a transient to exist for that time. If the highest frequency in the message modulation has a period of 67 microseconds (corresponding to 15 kc) then most such disturbances that may occur will not affect the reception of the originally stronger signal.

In the case of co-channel interference arising from signals separated by less than one i-f bandwidth, the flywheel effect may also be exhibited. The complete conditions will not be presented here, but it may be stated in general that if the frequencies of the two signals are always separated by about one-quarter of the i-f bandwith or more, any change in relative signal strengths, such as may be due to fading, for example, will not aggravate the interference or result in a shift from one signal to the other, if the originally weaker signal becomes the stronger signal for only a short interval of time.

One of the important features of the invention resides in a sufficient amount of feedback to insure a self-oscillating condition in the absence of a signal. The system will oscillate at a frequency at which the fedback signal arrives in phase with the input signal provided a condition of unit gain around the loop is possible. The frequency of oscillation will usually be at or near the center frequency of the i-f amplifier, but it may be at a frequency differing from the i-f frequency, depending on the parameters of the limiter and the feedback amplifier. In any event, with sufficient feedback, self-oscillations will occur at same frequency.

The self-oscillating condition is desirable, because it saturates the limiter and prevents reception of background noise and "interstation" noise. In the absence of an incoming signal the effect of the oscillation, so far as the listener is concerned, is as if an unmodulated carrier were being received; under such circumstances background noise is squelched.

Figure 6:
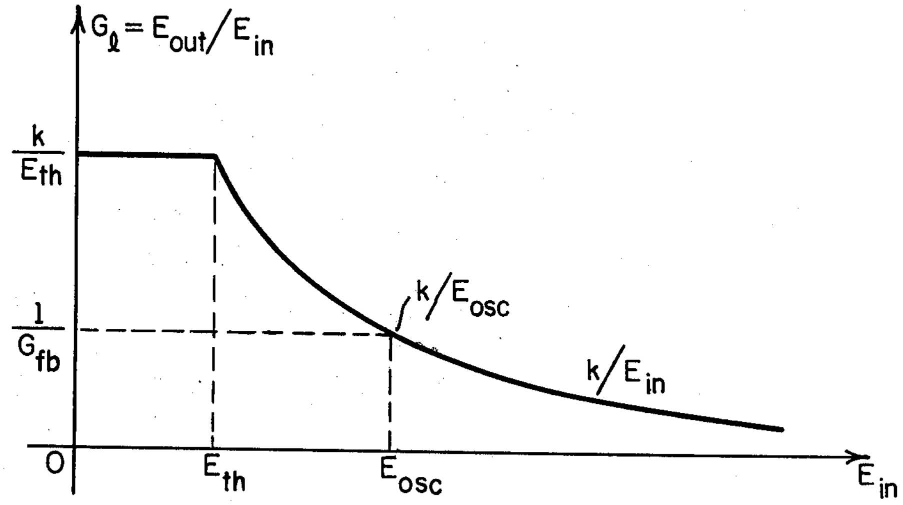

When a signal of sufficient strength and proper frequency comes in, the conditions for self-oscillation are upset. The limiter characteristic of FIG. 5 is a plot of output voltage amplitude against input voltage amplitude at the limiter. The "gain" of the limiter system is the ratio of $E_{out}/E_{in}$ and is represented by the slope of a line from the origin to the curve. This gain is separately plotted in FIG. 6. In the absence of an incoming signal, there will be a value of voltage, designated $E_{osc}$ which will represent the input voltage to the limiter at the oscillating frequency. Since the output voltage is always k with ideal limiting action, the gain curve of FIG. 6 is simply a plot of $^k/E_{in}$ for all values of $E_{in}$ greater than the threshold value. The loop including the limiter and the feedback will oscillate at a frequency at which the product of the limiter gain $^k/E_{in}$ by the feedback gain $G_{fb}$ equals unity. This condition is illustrated in FIG. 6 wherein $E_{osc}$ assumes such a value that $^k/E_{osc} = {}^1/G_{fb}$.

When a signal of sufficient strength and proper frequency comes in $E_{in}$ is increased, and it will be seen that the limiter gain is reduced in order to maintain the output voltage constant. Under such conditions, with a constant feedback gain $G_{fb}$ there is no point on the curve of FIG. 6 to the right of $E_{osc}$ that will produce the required condition of unity gain around the loop. Hence the signal is received and the self-oscillation is squelched.

When the phase shift around the loop varies with frequency, with the result that signals whose frequencies differ from the frequency of self-oscillation do not arrive directly in phase with their input counterparts, a condition exists which decides whether or not a proper transfer of the energy of self-oscillation to the frequency of the input signal will arise. This condition shows that the input signal must have a frequency that lies within a well-defined frequency range, which means that the system acts as a dynamic filter with a well-defined pass band.

It may be possible under some circumstances to have an amount of positive feedback that will improve the interference ratio, yet without resulting in self-oscillation. Such a system will be advantageous in providing some reduction of interference, but the preferred system involves the use of considerable gain in the feedback channel for three reasons; first, because as shown in FIG. 7, the higher the value of $K_s$, the greater will be the improvement in the capture ratio through the feedback; second, because the self-oscillation itself serves to squelch background noise; and third, because of the pronounced dynamic filter action that the oscillating limiter exhibits.

Figure 2:
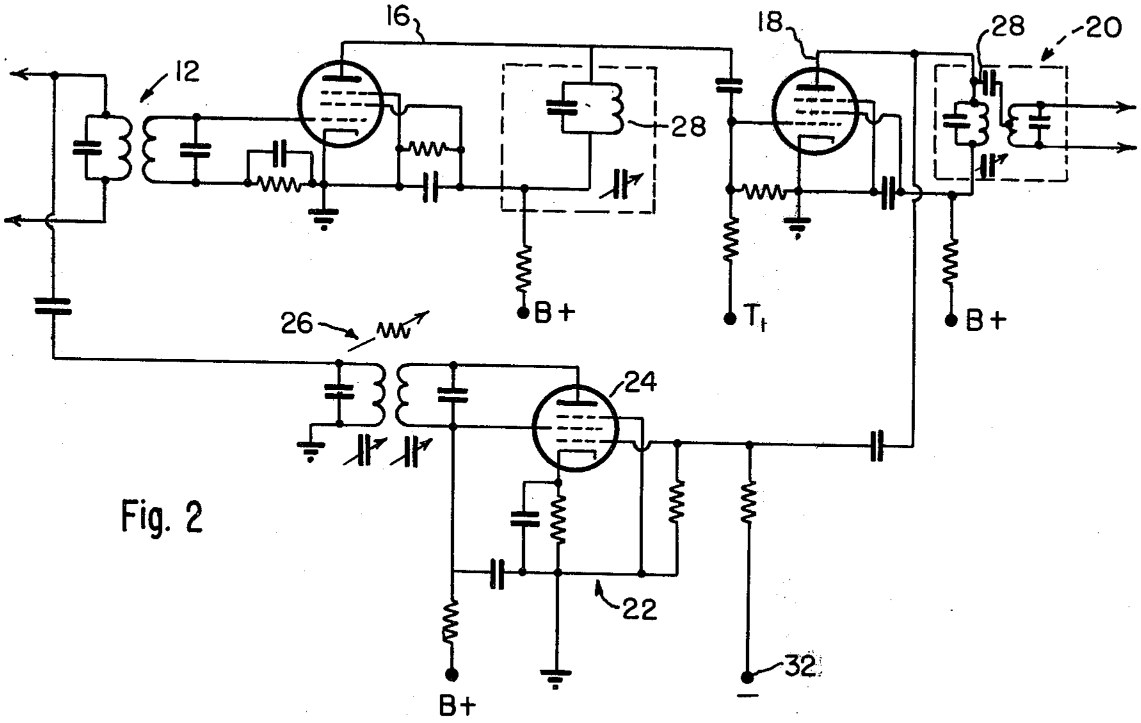
FIG. 2 is a schematic diagram of a part of the receiver.

Any number of stages of limiting may be used, and the feedback circuit may span some or all of them. In FIGS. 1 and 2 I show the feedback spanning two stages. The longer the chain of narrow-band limiters that is spanned by the feedback branch, the more insignificant the amplitude of the weaker signal relative to the stronger signal becomes with positive feedback.

When the feedback is taken through a feedback bandwidth of one i-f bandwidth, from the output of the $n^{th}$ limiter in a chain to the input of the first limiter, then the effect of the feedback upon the ratio of weaker-to-stronger signal amplitude at the input to the first limiter is greatest when each limiter, up to and including the $(n-1)^{st}$, possesses a bandwidth value of one i-f bandwidth.

Figure 8:
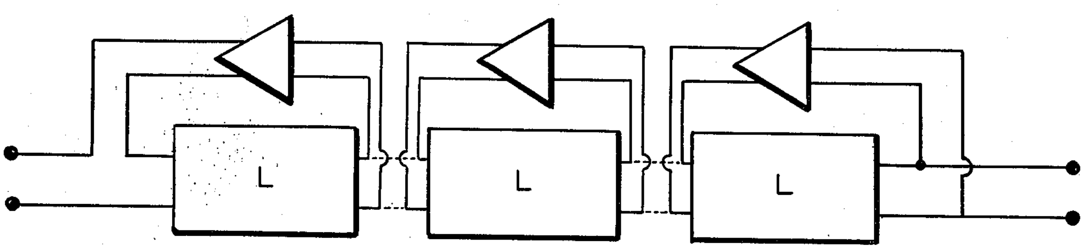
FIG. 8 is a block diagram of a modified form of limiter system with feedback.

An effective and desirable arrangement results when several limiters are cascaded, each of which has regenerative feedback applied from its output to its input, as shown in FIG. 8, which shows three cascaded limiters L, each of which is associated with its own positive feedback circuit, each of which is capable of self-oscillation in the absence of an incoming signal.

In summary, the preferred embodiment of the invention comprises feedback around the limiter (in one or more stages), with a preferable band limitation to one i-f bandwidth may be used, as for example, up to five i-f ban dwidths. As heretofore described, the limiter-feedback loop may be constructed without significant band limitation, in which case considerable improvement is obtained through saturation of the limiter, but the maximum improvement is obtained by band limitation, together with sufficient feedback to cause self-oscillation in the absence of an imcoming signal.

Having thus described the invention, I claim:

1. A frequency-modulation receiver comprising a driving amplifier having a pass band at least as great as twice the maximum frequency deviation of the signals to be received, a limiter connected to the output of the driving amplifier, detecting means connected to the limiter output, and an amplifier connected between the output and the input of the limiter to provide the condition of in-phase feedback only for signals lying near the center frequency of the pass band of the driving amplifier, said limiter and amplifier forming a feedback loop which provides regenerative feedback for a frequency-modulated signal input to the limiter.

2. A frequency-modulation receiver comprising a driving amplifier having a pass band at least as great as twice the maximum frequency deviation of the signals to be received, a limiter connected to the output of the driving amplifier, detecting means connected to the limiter output, and a feedback amplifier connected between the output and the input of the limiter, said amplifier being constructed to cause in the absence of a received signal a self-oscillating condition at a single fixed frequency in the pass band of the driving amplifier.

3. A frequency-modulation receiver comprising a driving amplifier having a pass band at least as great as twice the maximum frequency deviation of the signals to be received, a limiter connected to the output of the driving amplifier, detecting means connected to the limiter output, and a feedback circuit connected between the output and the input of the limiter, said feedback circuit including an amplifier and a filter, the feedback amplifier being constructed to cause in the absence of a received signal a self-oscillating condition at a single fixed frequency in the pass band of the driving amplifier, and the filter being constructed to substantially limit the condition of in-phase feedback to signals of frequencies within said pass band.

4. In a frequency-modulation receiver having an intermediate-frequency amplifier, a limiter and detecting means, wherein the pass band of the intermediate-frequency amplifier is at least twice the maximum frequency deviation of the signals to be handled by the detecting means, a feedback circuit connected from the output to the input of the limiter and constructed to cause self-oscillation at a frequency near the center frequency of the intermediate-frequency amplifier in the absence of a a frequency modulated signal input to the limiter, the limiter and feedback circuit forming a loop which is limited in bandwidth to approximately the intermediate frequency bandwidth, whereby the presence of a frequency modulated signal within said bandwidth at the input of the limiter prevents said self-oscillation by reduction of gain of the limiter and whereby said frequency modulated signal is regeneratively fed back around said loop.

* * * * *